US012801857B2

(12) United States Patent
Jagpal et al.

(10) Patent No.: US 12,801,857 B2
(45) Date of Patent: Nov. 17, 2026

(54) SYSTEMS AND METHODS FOR COMPUTER APPLICATION AUDIT ORGANIZATION

(71) Applicant: JPMORGAN CHASE BANK, N.A., New York, NY (US)

(72) Inventors: Jay Jagpal, Glasgow (GB); Stacy A Kandel, Easton, PA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 134 days.

(21) Appl. No.: 18/889,084

(22) Filed: Sep. 18, 2024

(65) Prior Publication Data

US 2025/0094721 A1 Mar. 20, 2025

Related U.S. Application Data

(60) Provisional application No. 63/583,503, filed on Sep. 18, 2023.

(51) Int. Cl.
*G06F 40/30* (2020.01)
*G06F 40/205* (2020.01)

(52) U.S. Cl.
CPC ............ *G06F 40/30* (2020.01); *G06F 40/205* (2020.01)

(58) Field of Classification Search
CPC ............................... G06F 40/30; G06F 40/205
USPC .............................................................. 704/9
See application file for complete search history.

(56) References Cited

U.S. PATENT DOCUMENTS

| | | | | |
|---|---|---|---|---|
| 8,204,751 | B1 * | 6/2012 | Di Fabbrizio | G10L 15/22 704/277 |
| 9,542,956 | B1 * | 1/2017 | Nostrant | G10L 15/22 |
| 9,612,992 | B2 * | 4/2017 | Hurd | G06F 13/4068 |
| 10,388,272 | B1 * | 8/2019 | Thomson | G10L 15/22 |
| 10,768,977 | B1 * | 9/2020 | Paul | H04L 67/34 |
| 10,832,249 | B1 * | 11/2020 | Flowers | G06F 40/30 |
| 10,997,403 | B1 * | 5/2021 | Fleming | G06F 40/216 |
| 11,048,711 | B1 * | 6/2021 | Fleming | G06F 40/284 |
| 11,120,227 | B1 * | 9/2021 | Cougias | G06F 21/604 |
| 11,425,215 | B1 * | 8/2022 | Lewis | H04L 67/63 |
| 11,790,177 | B1 * | 10/2023 | Barrasso | H04M 3/2281 704/9 |
| 11,803,661 | B1 * | 10/2023 | Sutherland | G06F 40/169 |
| 12,676,800 | B2 * | 7/2026 | Zeng | H04L 41/5019 |
| 2009/0112741 | A1 * | 4/2009 | Kershner | G06Q 40/12 705/30 |
| 2014/0379357 | A1 * | 12/2014 | Srivathsa | G16Z 99/00 705/2 |
| 2016/0124614 | A1 * | 5/2016 | Bromberg | G06F 3/04817 715/733 |
| 2016/0350486 | A1 * | 12/2016 | Plunkett | G16H 10/60 |

(Continued)

*Primary Examiner* — Thuykhanh Le
(74) *Attorney, Agent, or Firm* — GREENBERG TRAURIG LLP

(57) ABSTRACT

Systems and methods for computer program audit organization may leverage advanced technologies, including large language models (LLMs) and feedback controllers, to automate and streamline the audit process. The system receives audit requests, auto-populates them with relevant details, and breaks them into parts specifying responsive artifacts. The parts are routed to application owners and developers for review and response. A feedback controller interacts with an LLM to modify suggested responses and evidence based on feedback. The system bundles approved files into a package and sends notifications to audit participants.

20 Claims, 3 Drawing Sheets

(56) References Cited

U.S. PATENT DOCUMENTS

| | | | | |
|---|---|---|---|---|
| 2017/0364495 | A1* | 12/2017 | Srinivasan | G06F 3/0484 |
| 2018/0011931 | A1* | 1/2018 | Modani | G06F 40/211 |
| 2018/0129181 | A1* | 5/2018 | Kratzer, III | G06F 40/30 |
| 2018/0268384 | A1* | 9/2018 | Jung | G06Q 20/325 |
| 2019/0385711 | A1* | 12/2019 | Shriberg | G10L 25/66 |
| 2020/0104957 | A1* | 4/2020 | Guo | G06F 40/30 |
| 2020/0265409 | A1* | 8/2020 | Babu | G06N 20/00 |
| 2020/0356951 | A1* | 11/2020 | Cristache | G06Q 10/10 |
| 2021/0004165 | A1* | 1/2021 | Benisty | G06F 3/0661 |
| 2021/0004810 | A1* | 1/2021 | Lind | G06V 30/418 |
| 2021/0004912 | A1* | 1/2021 | Stark | G06N 3/09 |
| 2021/0004949 | A1* | 1/2021 | Broyda | G06V 30/418 |
| 2021/0224671 | A1* | 7/2021 | Cristache | G06N 5/022 |
| 2022/0108069 | A1* | 4/2022 | Lee | G06F 40/279 |
| 2022/0215244 | A1* | 7/2022 | Le | G06N 3/006 |
| 2022/0237506 | A1* | 7/2022 | Feldman | G06F 9/45558 |
| 2022/0272054 | A1* | 8/2022 | Gao | G06F 40/284 |
| 2022/0319508 | A1* | 10/2022 | Furman | G06F 40/30 |
| 2022/0374130 | A1* | 11/2022 | Pu | G06F 1/163 |
| 2023/0054004 | A1* | 2/2023 | Cristache | B25J 9/1635 |
| 2023/0185793 | A1* | 6/2023 | Farhi | G06F 16/2365 707/690 |
| 2023/0244506 | A1* | 8/2023 | Geller | G06F 3/167 715/764 |
| 2023/0266896 | A1* | 8/2023 | Rho | G06F 12/0246 711/154 |
| 2023/0315715 | A1* | 10/2023 | Zhong | G06F 16/2358 |
| 2023/0395072 | A1* | 12/2023 | Taylor | G06F 9/445 |
| 2024/0086555 | A1* | 3/2024 | Gulati | G06F 21/31 |
| 2024/0087752 | A1* | 3/2024 | Rutowski | G16H 80/00 |
| 2024/0104294 | A1* | 3/2024 | Shen | G06F 40/166 |
| 2024/0107098 | A1* | 3/2024 | Jang | H04N 21/266 |
| 2024/0144676 | A1* | 5/2024 | Arroyo | G06V 10/82 |
| 2024/0243978 | A1* | 7/2024 | Zeng | H04L 41/0806 |
| 2025/0078095 | A1* | 3/2025 | Manikani | G06Q 30/018 |
| 2025/0094720 | A1* | 3/2025 | Musundi | G06F 40/30 |
| 2026/0119818 | A1* | 4/2026 | Ying | G06F 40/40 |

* cited by examiner

SYSTEMS AND METHODS FOR COMPUTER APPLICATION AUDIT ORGANIZATION

RELATED APPLICATIONS

This application claims priority to, and the benefit of, U.S. Provisional Patent Application Ser. No. 63/583,503, filed Sep. 18, 2023, the disclosure of which is hereby incorporated, by reference, in its entirety.

BACKGROUND OF THE INVENTION

1. Field of the Invention

Embodiments are generally directed to systems and methods for computer program audit organization.

2. Description of the Related Art

Software audit processes are difficult, and often include three distinct factors of education. For example, with software knowledge, a developer understands the application, the source, and the ecosystem. The developers within a company intimately understand the tools available to them and how to use them.

Managers, project managers, and their superiors understand the direction of the software—pushing the business direction over a long-term strategy. They understand how the developer processes connect with the company business.

Mostly defined within a diligence role, audit team members focus on technology allowances, governances, and handling top-down challenges, thus ensuring the company adhere to the higher requests. In most cases, the auditors do not understand the technology platform with the in-depth knowledge of a senior or developer.

The current audit process is very manual and requires large amounts of time and attention and re-work to be done. On a re-opened audit, there is no efficient way to review and gather historical data and documents to help auditors be more organized and efficient with their time.

SUMMARY OF THE INVENTION

Systems and methods for computer program audit organization are disclosed. According to one embodiment, a method may include receiving, by a computer program, a request for audit information from an auditor electronic device, wherein the request includes an identification of textual and asset contents necessary to fulfill the request; auto-populating, by the computer program, an audit request with relevant details and open questions for resolution and suggested responsive materials; breaking, by the computer program, the audit request into a plurality of parts; routing, by the computer program, one or more of the parts to an application owner electronic device for review; assigning, by the application owner electronic device, the parts of the audit request to one or more developer electronic devices; providing, by the computer program, suggested evidence that may be responsive to the audit request; receiving, by the computer program, responses from the developer electronic devices; modifying, by a feedback controller interacting with a large language model, the responses from the developer electronic devices and suggesting additional suggested evidence based on feedback from the developer electronic devices and the auditor electronic device; reviewing, by the application owner electronic device, the modified responses for responsiveness and approving or rejecting the responses; bundling, by the computer program, the approved modified responses and sending to the auditor electronic device for approval; and sending, by the computer program, notifications to audit participants in response to the auditor electronic device approving the approved modified responses.

In one embodiment, the request for audit information may also include preliminary findings, wherein the preliminary findings include an auditor's knowledge on a topic.

In one embodiment, the step of auto-populating the audit request with relevant details and open questions for resolution and suggested responsive materials may include generating, by the computer program, a structured format for the audit request comprising a plurality of predefined sections.

In one embodiment, the plurality of parts may be identified using an artificial intelligence engine trained on historical audits.

In one embodiment, the feedback controller modifies the responses from the developer electronic devices and suggests the additional suggested evidence by parsing textual content of the audit request and providing the parsed textual content to the large language model.

In one embodiment, the method may also include receiving, by the computer program, feedback or a request for additional information in response to the responses being incomplete or inaccurate.

In one embodiment, the suggested evidence and the additional suggested evidence may include structured and unstructured files.

According to another embodiment, a system may include an auditor electronic device executing an auditor computer program; an application owner electronic device executing an application owner computer program; one or more developer electronic devices, each executing a developer computer program; and an audit organization electronic device executing an audit organization computer program; wherein the audit organization computer program receives a request for audit information from the auditor electronic device, wherein the request includes an identification of textual and asset contents necessary to fulfill the request; the audit organization computer program auto-populates an audit request with relevant details and open questions for resolution and suggested responsive materials; the audit organization computer program breaks the audit request into a plurality of parts; the audit organization computer program routes one or more of the parts to an application owner electronic device for review; the audit organization computer program assigns the parts of the audit request to one or more developer electronic devices; the audit organization computer program provides suggested evidence that may be responsive to the audit request; the audit organization computer program receives responses from the developer electronic devices; the audit organization computer program modifies, using a feedback controller interacting with a large language model, the responses from the developer electronic devices and suggests additional suggested evidence based on feedback from the developer electronic devices and the auditor electronic device; the audit organization computer program reviews the modified responses for responsiveness and approving or rejecting the responses; the audit organization computer program bundles the approved modified responses and sending to the auditor electronic device for approval; and the audit organization computer program sends notifications to audit participants in response to the auditor electronic device approving the approved modified responses.

In one embodiment, the request for audit information may also include preliminary findings, wherein the preliminary findings include an auditor's knowledge on a topic.

In one embodiment, the audit organization computer program auto-populates the audit request with relevant details and open questions for resolution and suggested responsive materials by generating a structured format for the audit request comprising a plurality of predefined sections.

In one embodiment, the plurality of parts may be identified using an artificial intelligence engine trained on historical audits.

In one embodiment, the feedback controller modifies the responses from the developer electronic devices and suggests the additional suggested evidence by parsing textual content of the audit request and providing the parsed textual content to the large language model.

In one embodiment, the audit organization computer program receives feedback or a request for additional information in response to the responses being incomplete or inaccurate.

In one embodiment, the suggested evidence and the additional suggested evidence may include structured and unstructured files.

According to another embodiment, a non-transitory computer readable storage medium, including instructions stored thereon, which when read and executed by one or more computer processors, cause the one or more computer processors to perform steps comprising receiving a request for audit information from an auditor electronic device, wherein the request includes an identification of textual and asset contents necessary to fulfill the request; auto-populating an audit request with relevant details and open questions for resolution and suggested responsive materials; breaking the audit request into a plurality of parts; routing one or more of the parts to an application owner electronic device for review; assigning the parts of the audit request to one or more developer electronic devices; providing suggested evidence that may be responsive to the audit request; receiving responses from the developer electronic devices; modifying, using a large language model, the responses from the developer electronic devices and suggesting additional suggested evidence based on feedback from the developer electronic devices and the auditor electronic device; reviewing the modified responses for responsiveness and approving or rejecting the responses; bundling the approved modified responses and sending to the auditor electronic device for approval; and sending notifications to audit participants in response to the auditor electronic device approving the approved modified responses.

In one embodiment, the request for audit information may also include preliminary findings, wherein the preliminary findings include an auditor's knowledge on a topic.

In one embodiment, the step of auto-populating the audit request with relevant details and open questions for resolution and suggested responsive materials includes instructions stored thereon, which when read and executed by the one or more computer processors, cause the one or more computer processors to perform steps comprising generating a structured format for the audit request comprising a plurality of predefined sections.

In one embodiment, the plurality of parts may be identified using an artificial intelligence engine trained on historical audits.

In one embodiment, the instructions to modify the responses from the developer electronic devices and to suggest additional suggested evidence based on feedback from the developer electronic devices and the auditor electronic device, when read and executed by one or more computer processors, cause the one or more computer processors to perform steps comprising parsing textual content of the audit request; and providing the parsed textual content to the large language model.

In one embodiment, the non-transitory computer readable storage medium may also include instructions stored thereon, which when read and executed by the one or more computer processors, cause the one or more computer processors to perform steps comprising receiving feedback or a request for additional information in response to the responses being incomplete or inaccurate.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
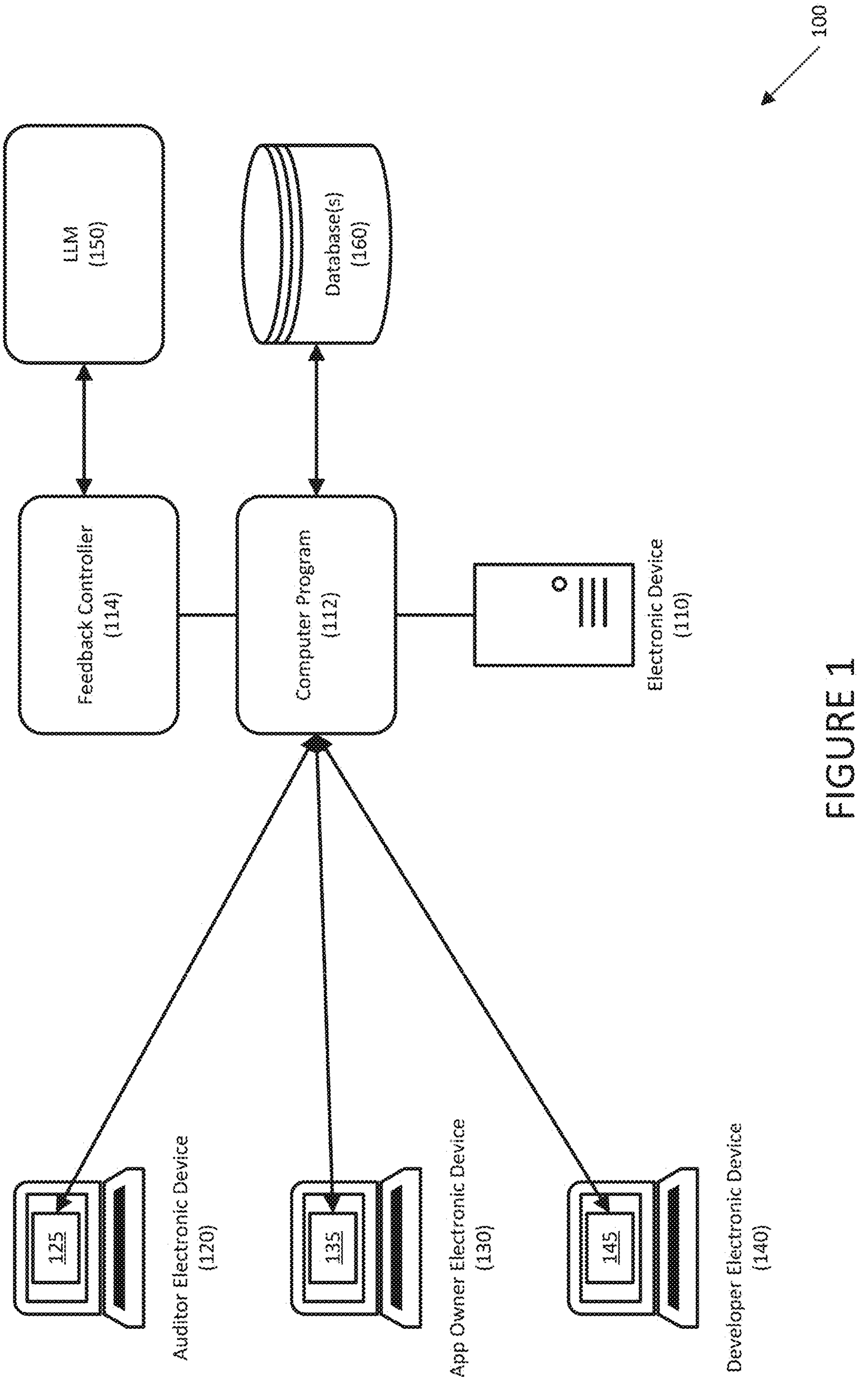
FIG. 1 illustrates a system for computer program audit organization according to an embodiment.

Systems and methods for computer program audit organization are disclosed.

The disclosed system and method provide a comprehensive solution for computer program audit organization. The system leverages advanced technologies, including large language models (LLMs) and feedback controllers, to automate and streamline the audit process. By integrating these technologies, the system can analyze audit requests, generate structured and unstructured data suggestions, and facilitate efficient communication between auditors, application owners, and developers. This approach not only reduces the time and effort required for audits but also enhances the accuracy and consistency of the results, ensuring compliance with regulatory standards and improving overall audit efficiency.

Compared to conventional systems, embodiments may improve the operation of the system and individual devices therein by efficiently using system resources. For example, embodiments may reduce unnecessary communications and may suggest responses and evidence that may be responsive to the audit request.

The disclosed system and method may provide for the auditing and managing of applications at scale, and mass scale processes through an autonomous or multi-modal centralized feedback controller that is capable of adapting to various domains, such as software-based applications, governmental procedures, and/or other complex systems.

Conventional systems may be incompatible with heterogeneous third-party systems. Thus, embodiments may provide an autonomous or multi-modal centralized feedback controller that is agnostic to the underlying technologies and is capable of adapting to various domains, such as software-based applications, governmental procedures, and/or other complex systems.

Embodiments may use feedback and safeguards through user iterations (e.g., governance and end-user), reviewed training, and self-monitoring steps while evaluating inputs, etc. until it becomes fully self-sufficient and self-reliant. This may ensure broad-scale, persistent care over the system's lifetime, allowing for iterative upgrades without altering controllers core features, or interrupting concurrent audit management.

Embodiments may organize and track audit requirements and requests. For example, an audit request may be received and broken into parts (e.g., chapters), and each part may specify artifacts that are responsive to the request. Users and auditors may track the progress of the audit responses and may approve, reject, or send the responses back to them for more information. Users may further ask the computer program for suggestions on how to respond to an assigned part of the audit request.

Embodiments may provide text boxes to allow for entry or attachment of evidence and/or comments and upload any files. Embodiments may provide notifications after an event is added to notify audit participants of the audit and its trail. Notification may be by SMS/text, email, etc.

Embodiments may use LLMs that may be trained on a prior audit to understand the auditor's full request to summarize and break the audit request into the parts or chapters for receiving evidence. As feedback is received from both the application developers and the auditors, the LLMs may modify responses and evidence based on the feedback, and may suggest a more accurate response and supporting evidence, such as suggesting structured and unstructured file types, to better respond to the audit request.

Embodiments may use single sign on for access so that the identity of the users are known. Using this information, embodiments may identify and display any open audit requests that are assigned to that individual, any needed actions, etc. This may be provided, for example, in a dashboard.

Embodiments may provide a fully self-reliant, self-healing architecture that may manage and optimize complex systems. Embodiments may ensure continuous audit and compliance processes based on inputs from auditing bodies or software governance controls. In embodiments, the system may evolve to function independently, with the ability to handle and predict changes across various domains without the need for user intervention.

Once the feedback controller is trained over iterations, such as part of all of an audit season comprising of timely repeat queries, the system may receive feedback on compliance points independently and may then assess if the queries can be handled without human interaction. The system may respond to the request using the same resources and information a human developer would provide.

Both positive and negative responses from developers and auditors may be applied to the concurrent iteration. This may be processed down through a model fusion onto the existing base norm model.

Embodiments may provide a feedback controller that may be a model that is tuned from positive and negative responses from users to determine which information is to be provided. The feedback controller may be based on two models that may run concurrently, using a self-iterative norm and a self-healing strategy through an aggregation method (e.g., late fusion) in an iterative feedback loop. In embodiments, the feedback controller may adapt in near real-time after a small number of iterations, applicable to multiple domains.

In one embodiment, the feedback controller may use a fusion model that may be based on a base model and iterations that may also interact with the LLM. This may be considered to be the primary model, and may be updated with the results of each audit cycle.

Referring to FIG. 1, a system for computer program audit organization is disclosed according to an embodiment. System 100 may include electronic device 110, which may be a server (e.g., physical and/or cloud-based), a computer (e.g., workstation, desktop, laptop, notebook, tablet, etc.) that executes computer program 112, such as an audit organization computer program. Computer program 112 may interface with auditor computer program 125 executed by auditor electronic device 120, application owner computer program 135 executed by application owner electronic device 130, and developer computer program 145 executed by developer electronic device 140. Electronic devices 120, 130, and 140 may be any suitable electronic devices, including computers, smart devices (e.g., smartphones, smart watches, etc.), Internet of Things appliances, etc.

Computer program 112 may further interact with feedback controller 114, which may receive feedback from auditor computer program 125, application owner computer program 135, and/or developer computer program 145, directly or indirectly via computer program 112. Feedback controller 114 may use LLM 150 to modify its suggested responses and suggested evidence.

Feedback controller 114 may manage and optimize the flow of information between auditors, application owners, and developers. Feedback controller 114 may receive input from various sources, including audit requests, responses from developers, and feedback from auditors. By LLM 150 and machine learning algorithms, feedback controller 114 may process this input to generate accurate and relevant suggestions for audit responses. Feedback controller 114 may continuously learn from the interactions and feedback it receives, allowing feedback controller 114 to refine the feedback controller's suggestions and improve the feedback controller's performance over time.

Upon receiving an audit request, feedback controller 114 may analyze the request and may identify the necessary details and questions that need to be addressed. Feedback controller 114 may then auto-populate the audit request with relevant information and may suggest additional details or questions to ensure the request is fully understood. As developers respond to the audit request, feedback controller 114 may evaluate their responses, which may include structured files (e.g., data adhering to a predefined format) and unstructured files (e.g., data that lacks a specific format), and may modify the suggested responses and evidence based on the feedback received. This iterative process ensures that the audit responses are accurate, comprehensive, and aligned with the audit requirements.

Feedback controller 114 may employ a model fusion approach to integrate multiple models and knowledge sources, enabling feedback controller 114 to provide precise and contextually relevant suggestions. This may involve merging the current iteration model, which contains the most recent learning, with an existing primary model through an intermediate network. The intermediate network bridges the layers of both models, ensuring that the integrity of previous knowledge is maintained while incorporating new information. This fusion process allows feedback controller 114 to adapt in near real-time, making feedback controller 114 capable of handling complex audit requests across various domains with minimal human intervention.

Database(s) 160 may store information responsive to the audit request. Depending on the type of audit request, databases 160 may include code repositories, code management systems, document management system, etc.

LLM 150 may enhance the audit process by automating the analysis and generation of audit requests. Upon receiving an audit request, LLM 150 may analyze the request to identify necessary details and questions that need to be addressed. LLM 150 may then auto-populate the audit request with relevant information and may suggest additional details or questions to ensure the request is fully understood. This reduces the need for back-and-forth communication, thereby streamlining the audit process.

Figure 2:
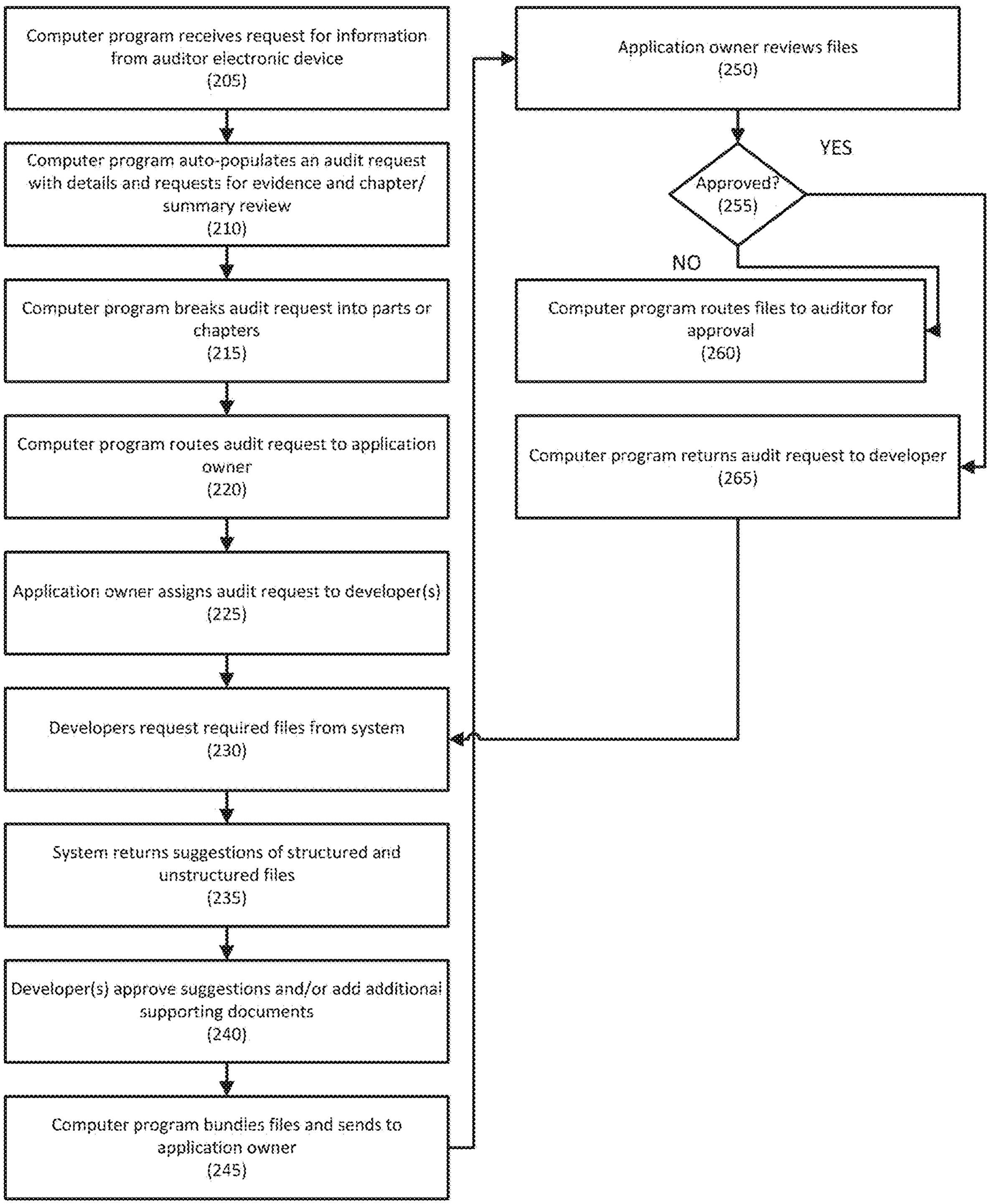
FIG. 2 illustrates a method for computer program audit organization according to an embodiment.

Referring to FIG. 2, a method for computer program audit organization is disclosed according to an embodiment.

In step 205, a computer program, such as an audit organization computer program, may receive a request for audit information from an auditor electronic device. For example, the request may be for textual and asset contents (e.g., files) necessary to fulfil the request and may include a method of answering (e.g., a response template), preliminary findings (e.g., the auditor's knowledge on a topic), suggested fulfilment documents (e.g., an excel file of dates to find and populate), etc.

In one embodiment, the auditor may formulate the questions for the application owner. This may be a subset of an overall season of questions that may be dispersed through any suitable communication channel.

In step 210, the computer program may receive the request for audit information and may auto-populate an audit request with details and requests for evidence, as well as suggested responsive materials. This may include generating a structured format for the audit request. For example, the computer program may organize the request for audit information into predefined sections, such as background information, specific questions, and required evidence. Each section may be populated with relevant data, including textual descriptions, references to applicable documents, and links to necessary resources.

The computer program may also suggest additional details or questions to ensure the request for audit information is fully understood and to minimize the need for further clarification. This structured approach facilitates a clear and organized presentation of the audit request, making the audit request easier for application owners and developers to understand and respond to the requirements.

The audit request may be populated with requests for information (e.g., questions populated by a governing body) and may identify a system of record for the current knowledge layer and the base norm and the base language model, etc.

A feedback controller may generate a pre-build view for control procedures that cannot be answered with existing knowledge sources. It may use a request for information textual query, associated resources (e.g., images, files, downloads, application owner notes, etc.), a form for user input, etc. The form fields may be inferred from the textual query. In one embodiment, a large language model may be used to identify the form fields; in another embodiment, an action tuned model may be used.

In embodiments, the feedback model may include a primary model that may be based on prior iterations that may have a newer lesser model built upon it. The newer lesser model may be a non-generative deep neural net that may be trained to focus on specific events or key statements for example validation models. This may assign confidence to relevancy of a topic.

For example, the current iteration model may be fused to the feedback model with an intermediate model. The intermediate model bridges the iteration model layers and primary model layers through a distinct set of nodes, linking the indexed matched layers through a neural network. The depth (from input to output) and input nodes may match the depth of the largest model. Hidden layers exist between the nodes of both models, connected to every layer through the depth.

For example, the first hidden node of the first layer within the intermediate network layers may connect to a sibling layer of the current iteration model, and the primary model. This occurs for every layer in the intermediate network, in essence adding an additional input weight on every layer within the intermediate network.

This intermediate network may be trained on the same queries applied to the feedback model and any iteration layers, using the same input nodes and the feedback controller's existing knowledge.

By merging the current iteration model, containing the most recent learning, and the existing primary model through training the intermediate layers to softly align with activations from both models—whilst respecting the input query—the result produces a unified model with the integrity of previous knowledge intact in both models.

In one embodiment, the request for audit information may be provided to the primary model and the newer lesser models, and the results from the models may be scored through reciprocal ranking. The closest matches may be further refined through the model designated to critically analyze the choices for a relevancy, and further flourishing the result by enhancing the input terminology with additional phrases or clarifications.

The highest scored responses may be pre-populated in the audit request.

In step 215, the computer program may break the audit request into parts or chapters, such as subsets of the questions or requests for information. In one embodiment, the computer program may use an artificial intelligence engine that is trained on historical audits to understand the auditor's full request and to break the request into the parts or chapters.

In step 220, the auditor may optionally approve the contents of the audit request, and in response, the computer program may route the audit request to a computer program for the application owner of the application that is the subject of the audit request.

In one embodiment, the audit request may be sent to the application owner, and the application owner may be notified by email, SMS/text, etc. Embodiments may summarize the request and may flag each chapter requiring a response or evidence that will be needed. For example, the computer program may use a LLM to generate the summary.

In step 225, the application owner may assign the audit request to one or more developers of the application, and the computer program may route the audit request to developer (s) computer programs. If more than one developer is identified, the audit request may be routed to the developers sequentially. This may be based on the developer hierarchy that may be specified by the organization.

The application owner may assign the chapters from the audit request to team members, such as application developers, to review and respond to.

The assignments may be aligned by team/application/product. A developer may be aligned to any or all of these.

Tasks may be assigned to any member of a team. For example, a task may be assigned to the most applicable engineer. The assignment may be manifested as a request for information, assigned through the system user interface or may be forwarded to the target user.

Application developers may only receive requests for information that are relevant to their designated applications. For example, a developer may receive text from the auditor, documents and sheets, media and data relative to a task or industry (e.g., a production company auditor presents example video footage for existing marketing material to comply with), compressed files, operating system images, testing API resources, etc.

In step 230, the users may respond to the request that was routed to them. For example, the users may respond using a populated interface, such as a web form, a view generator, or an agnostic communications method of any form.

In one embodiment, in evaluating the request, a user may request information on how to respond. For example, a user may ask the computer program, "How do we answer audit procedure 1234?" The computer program may return information, such as examples of evidence to provide.

In one embodiment, the response may be provided by the feedback controller, which may be trained on prior responses, and/or by the LLM, which may be prompted with the question and the request at issue.

As responses and evidence are received from the developers and the auditors, the artificial intelligence engine may modify responses and may suggest additional evidence from previous audits to suggest a more accurate response and supporting evidence.

For example, the computer program may identify examples of evidence to provide by leveraging the LLM and machine learning algorithms. Upon receiving an audit request, the LLM may analyze the request to understand the context, the specific requirements, and the type of evidence needed. This analysis involves parsing the textual content of the request and extracting key details, such as the nature of the audit, the specific questions posed, and any guidelines or criteria provided by the auditor.

Once the key details are extracted, the computer program may cross-reference this information with a database of historical audit responses and domain-specific knowledge. This database may include previous audit submissions, documentation, logs, and other relevant artifacts. By comparing the current audit request with similar past requests, the program may identify patterns and examples of evidence that were previously deemed satisfactory. This historical data serves as a valuable resource for generating relevant and accurate suggestions for the current audit request.

If additional knowledge sources are retrieval augmented generation (RAG)-based, the data consolidation may occur without a convolution step, thereby reducing training time. For example, RAG techniques may be used to dynamically search for and retrieve relevant information from external sources. This may include accessing code repositories, document management systems, and other databases to locate supporting artifacts. The computer program may then suggest these artifacts as examples of evidence that may be responsive to the audit request. By combining historical data, feedback, and dynamic retrieval, the computer program ensures that the identified examples of evidence are comprehensive, accurate, and aligned with the audit requirements.

In responding to the request, the application developers may request certain files from the system. For example, the application developer may request that the system locate supporting artifacts—including, for example, structured and unstructured files—that are evidence and responsive to the audit request.

Auditors may make outbound requests to their owning system. Their application may maintain their own system of record and are pushed to users. These requests may filter to developers through liaisons and application owners through the standard communication channels (e.g., email, omnichannel, etc.).

In step 235, the system may return a suggestion of evidence that may be responsive to the audit request. For example, the feedback controller may apply concurrent learning to the newest iteration of the feedback model. This is a semi-isolated dataset designed to digest events and multi-model content from input streams.

In one embodiment, the computer program may use model fusion to identify the files to return. For example, two models may be merged by activating both models with a relevant query, scoring the results for relevancy, and binding the connections through weighted edges. The closest matches may be further refined through the model by critically analyzing the choices for relevancy, and further flourishing the result by enhancing the input terminology with additional phrases or clarifications.

In embodiments, layered model domains for each audit cycle may be concatenated on the base model. For example, each iteration requires the base model and a fundamental learning, such as all procedures for a given field or domain. Layered model domains for each audit cycle may be concatenated on the base model.

Unlike standard machine learning models, embodiments allow for the removal of an entire iteration without fundamentally destroying the primary model. The removal of a single cycle of learning (one audit season) can be "forgotten" without a subsequent failure of future requests to the primary model.

Through this format, external resources may be applied as a cluster of action models. The inputs may be any of textual, file data, or event based. In each case the result is stored input the concurrent iteration layer until an individual audit is complete, or an audit season (e.g., all audit procedures to be actioned through a designated period) closes. The closure of the audit season prompts the feedback controller to initiate regressive learning on the concurrent layer.

For the feedback model, a language model and any fundamental knowledge—such as all the existing procedures through history for software maintenance—may be built upon. The audit cycle essentially creates and builds upon its own layer, referred to as an iteration. The iteration is a mix of text context, and assets such as excel sheets and document files.

In step 240, the developer(s) may approve the suggestions and/or may add any additional supporting documents. For example, if the developer finds that the suggestions are accurate and relevant, the developer can approve them directly via an interface. The interface typically includes options such as checkboxes, buttons, or other input methods to indicate approval. If the developer identifies any issues or gaps in the suggestions, the developer can provide feedback or request additional information. The interface may include text boxes or comment sections for developers to input their feedback or questions.

The submission process may involve clicking a "Submit" or "Approve" button, which routes the approved responses to the next stage of the audit process, such as review by the application owner or final approval by the auditor.

In cases where the suggestions need adjustments, developers may modify the suggested responses directly within the interface. They can add, edit, or remove content as necessary to ensure that the responses are accurate and complete. The interface may provide tools for uploading additional files, attaching comments, or making other necessary changes.

In step 245, the computer program may retrieve and bundle the files (e.g., into a ZIP file), and may send the files to the computer program for the application owner. For example, as responses are received from developers and reviewed by application owners, the computer program may collect all relevant data, including structured and unstructured files, textual descriptions, comments, and feedback. This data may be aggregated and organized based on the audit request and its corresponding parts or chapters.

The stored data may be indexed to facilitate efficient retrieval. For example, the computer program may create indexes based on key attributes such as audit request IDs, user identities, timestamps, and file types. This indexing allows users to quickly search for and access specific audit results, improving the overall efficiency of the audit process.

The computer program may route the responses, including structured and unstructured files, to the application owner's electronic device. The files are presented in a clear and organized manner, often within a web-based interface or a dedicated application.

In step 250, the application owner may review the files for responsiveness. For example, the application owner may review the files for responsiveness through a structured and user-friendly interface designed to facilitate the review and approval process. The interface may include various sections, such as textual descriptions, attached documents, images, and other relevant files. Each section may provide a comprehensive view of the responses to the audit request.

The application owner may examine each file and piece of evidence to ensure that it meets the audit requirements and accurately addresses the audit request. This may include checking the completeness, accuracy, and relevance of the information provided. The interface may offer tools for zooming in on documents, viewing metadata, and navigating through multiple files.

If the application owner identifies any issues or gaps in the responses, the application owner may provide feedback or request additional information. The interface may include text boxes or comment sections for the application owner to input their feedback or questions. This feedback is then routed back to the developers for further action.

Once the application owner is satisfied with the responses, the application owner may submit the approved files through the interface. The submission process may involve clicking a "Submit" or "Approve" button, which routes the approved responses to the next stage of the audit process, such as final approval by the auditor.

In one embodiment, the computer program may implement role-based access control (RBAC) to ensure that only authorized users can access, modify, or delete the stored data. Users may be assigned roles based on their responsibilities, and each role has specific permissions associated with it. This ensures that sensitive information is only accessible to those who need it.

If, in step 255, the application owner approves the files, in step 260, the computer program may route the files to the auditor computer program for approval. The computer program may send notifications to relevant stakeholders, such as developers and auditors, to inform them of the approved or rejected responses. The interface may also include tracking features that allow the application owner to monitor the status of the submissions and receive updates on any further actions required.

The computer program may maintain a detailed audit trail and logging system to track all actions performed on the stored data. This includes recording who accessed the data, what changes were made, and when these actions occurred. The audit trail helps ensure accountability and provides a record of all activities related to the audit process.

If, in step 260, the application owner does not approve, in step 265, the computer program may return the audit request to the developer computer program(s), and the process may return to step 230.

Figure 3:
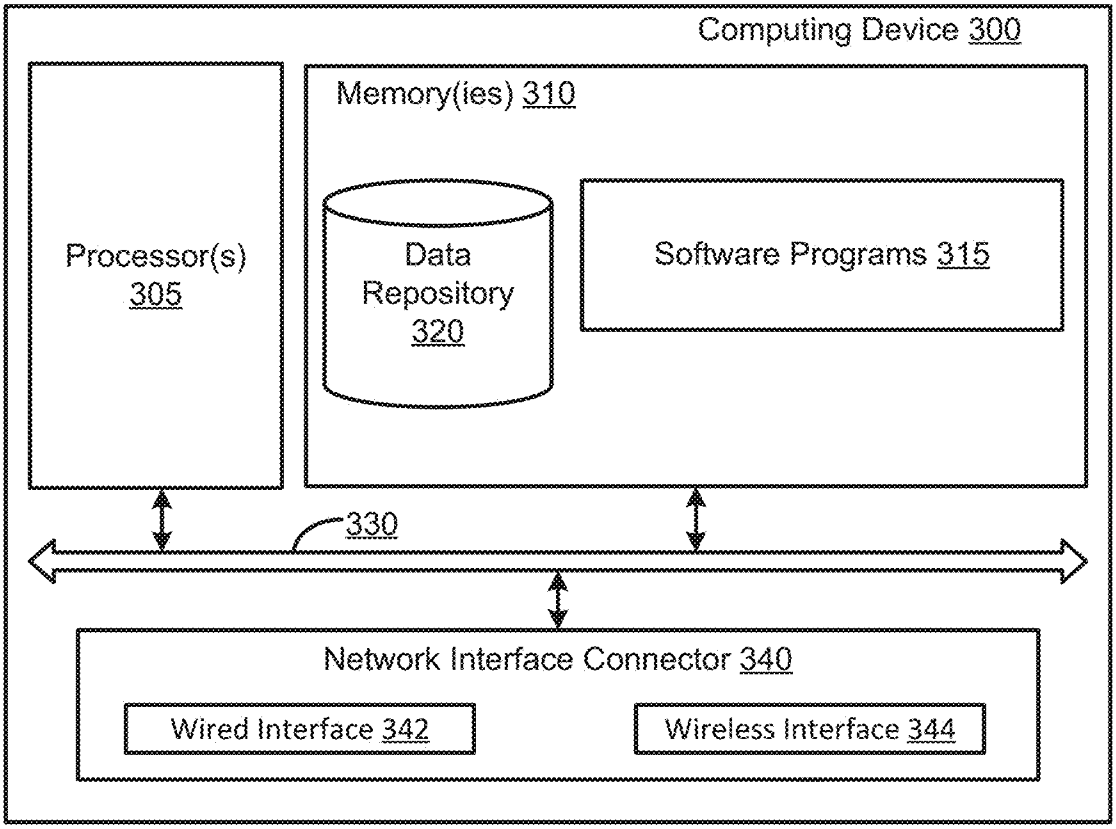
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity, i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method, comprising:

receiving, by a computer program, a request for audit information from an auditor electronic device, wherein the request includes an identification of textual and asset contents necessary to fulfill the request;

auto-populating, by the computer program, an audit request with relevant details and open questions for resolution and suggested responsive materials;

breaking, by the computer program, the audit request into a plurality of parts;

routing, by the computer program, one or more of the parts to an application owner electronic device for review;

assigning, by the application owner electronic device, the parts of the audit request to one or more developer electronic devices;

providing, by the computer program, suggested evidence that is responsive to the audit request using model fusion, to identify a plurality of electronic files to return;

receiving, by the computer program, response from the developer electronic devices, wherein each response comprises approval or rejection of the plurality of electronic files and additional electronic files to return;

modifying, by a feedback controller interacting with a large language model, the responses from the developer electronic devices and suggesting additional suggested electronic files based on feedback from the developer electronic devices and the auditor electronic device;

reviewing, by the application owner electronic device, the modified responses for responsiveness and approving or rejecting the responses;

bundling, by the computer program, the approved electronic files into a single file, wherein data in the single file is indexed to facilitate quick retrieval, and sending to the auditor electronic device for approval;

implementing, by the computer program, role-based access control on the data in the single file; and sending, by the computer program, notifications to audit participants in response to the auditor electronic device approving the approved modified responses.

2. The method of claim 1, wherein the request for audit information further comprises preliminary findings, wherein the preliminary findings include an auditor's knowledge on a topic.

3. The method of claim 1, wherein the step of auto-populating the audit request with relevant details and open questions for resolution and suggested responsive materials comprises:

generating, by the computer program, a structured format for the audit request comprising a plurality of predefined sections.

4. The method of claim 1, wherein the plurality of parts are identified using an artificial intelligence engine trained on historical audits.

5. The method of claim 1, wherein the feedback controller modifies the responses from the developer electronic devices and suggests the additional suggested evidence by parsing textual content of the audit request and providing the parsed textual content to the large language model.

6. The method of claim 1, further comprising:

receiving, by the computer program, feedback or a request for additional information in response to the responses being incomplete or inaccurate.

7. The method of claim 1, wherein the suggested evidence and the additional suggested evidence comprises structured and unstructured files.

8. A system, comprising:

an auditor electronic device executing an auditor computer program;

an application owner electronic device executing an application owner computer program;

one or more developer electronic devices, each executing a developer computer program; and an audit organization electronic device executing an audit organization computer program;

wherein:

the audit organization computer program receives a request for audit information from the auditor electronic device, wherein the request includes an identification of textual and asset contents necessary to fulfill the request;

the audit organization computer program auto-populates an audit request with relevant details and open questions for resolution and suggested responsive materials;

the audit organization computer program breaks the audit request into a plurality of parts;

the audit organization computer program routes one or more of the parts to an application owner electronic device for review;

the audit organization computer program assigns the parts of the audit request to one or more developer electronic devices;

the audit organization computer program provides suggested evidence that is responsive to the audit request using model fusion, to identify a plurality of electronic files to return;

the audit organization computer program receives responses from the developer electronic devices, wherein each response comprises approval or rejection of the plurality of electronic files and additional electronic files to return;

the audit organization computer program modifies, using a feedback controller interacting with a large language model, the responses from the developer electronic devices and suggests additional suggested electronic files based on feedback from the developer electronic devices and the auditor electronic device;

the audit organization computer program reviews the modified responses for responsiveness and approving or rejecting the responses;

the audit organization computer program bundles the approved electronic files into a single file, wherein data in the single file is indexed to facilitate quick retrieval, and sends to the auditor electronic device for approval;

the audit organization computer program implements role-based access control on the data in the single file; and the audit organization computer program sends notifications to audit participants in response to the auditor electronic device approving the approved modified responses.

9. The system of claim 8, wherein the request for audit information further comprises preliminary findings, wherein the preliminary findings include an auditor's knowledge on a topic.

10. The system of claim 8, wherein the audit organization computer program auto-populates the audit request with relevant details and open questions for resolution and suggested responsive materials by generating a structured format for the audit request comprising a plurality of predefined sections.

11. The system of claim 8, wherein the plurality of parts are identified using an artificial intelligence engine trained on historical audits.

12. The system of claim 8, wherein the feedback controller modifies the responses from the developer electronic devices and suggests the additional suggested evidence by parsing textual content of the audit request and providing the parsed textual content to the large language model.

13. The system of claim 8, wherein the audit organization computer program receives feedback or a request for additional information in response to the responses being incomplete or inaccurate.

14. The system of claim 8, wherein the suggested evidence and the additional suggested evidence comprises structured and unstructured files.

15. A non-transitory computer readable storage medium, including instructions stored thereon, which when read and executed by one or more computer processors, cause the one or more computer processors to perform steps comprising:

receiving a request for audit information from an auditor electronic device, wherein the request includes an identification of textual and asset contents necessary to fulfill the request;

auto-populating an audit request with relevant details and open questions for resolution and suggested responsive materials;

breaking the audit request into a plurality of parts;

routing one or more of the parts to an application owner electronic device for review;

assigning the parts of the audit request to one or more developer electronic devices;

providing suggested evidence that is responsive to the audit request using model fusion, to identify a plurality of electronic files to return;

receiving responses from the developer electronic devices, wherein each response comprises approval or rejection of the plurality of electronic files and additional electronic files to return;

modifying, using a large language model, the responses from the developer electronic devices and suggesting additional suggested electronic files based on feedback from the developer electronic devices and the auditor electronic device;

reviewing the modified responses for responsiveness and approving or rejecting the responses;

bundling the approved electronic files into a single file, wherein data in the single file is indexed to facilitate quick retrieval, and sending to the auditor electronic device for approval;

implementing role-based access control on the data in the single file; and sending notifications to audit participants in response to the auditor electronic device approving the approved modified responses.

16. The non-transitory computer readable storage medium of claim 15, wherein the request for audit information further comprises preliminary findings, wherein the preliminary findings include an auditor's knowledge on a topic.

17. The non-transitory computer readable storage medium of claim 15, wherein the step of auto-populating the audit request with relevant details and open questions for resolution and suggested responsive materials includes instructions stored thereon, which when read and executed by the one or more computer processors, cause the one or more computer processors to perform steps comprising:

generating a structured format for the audit request comprising a plurality of predefined sections.

18. The non-transitory computer readable storage medium of claim 15, wherein the plurality of parts are identified using an artificial intelligence engine trained on historical audits.

19. The non-transitory computer readable storage medium of claim 15, wherein the instructions to modify the responses from the developer electronic devices and to suggest additional suggested evidence based on feedback from the developer electronic devices and the auditor electronic device, when read and executed by one or more computer processors, cause the one or more computer processors to perform steps comprising:

parsing textual content of the audit request; and providing the parsed textual content to the large language model.

20. The non-transitory computer readable storage medium of claim 15, further including instructions stored thereon, which when read and executed by the one or more computer processors, cause the one or more computer processors to perform steps comprising:

receiving feedback or a request for additional information in response to the responses being incomplete or inaccurate.

* * * * *